United States Patent [19]

Faillace

[11] 4,437,046

[45] Mar. 13, 1984

[54] EXTRUSION DRIVE CONTROL SYSTEM

[75] Inventor: Louie M. Faillace, Pawcatuck, Conn.

[73] Assignee: Crompton & Knowles Corporation, New York, N.Y.

[21] Appl. No.: 389,937

[22] Filed: Jun. 18, 1982

[51] Int. Cl.$^3$ ............................................. G05B 19/24
[52] U.S. Cl. .................................... 318/571; 318/600; 364/476; 165/12
[58] Field of Search ............... 318/569, 571, 641, 650, 318/600; 364/476; 72/7, 13; 425/145, 149; 165/12

[56] References Cited

U.S. PATENT DOCUMENTS

| | | | |
|---|---|---|---|
| 3,825,735 | 7/1974 | Bowers | 318/569 X |
| 4,094,940 | 6/1978 | Hold | 364/476 X |
| 4,120,630 | 10/1978 | La Spisa et al. | 425/145 X |
| 4,388,576 | 6/1983 | Blatt | 318/571 |
| 4,392,195 | 7/1983 | Inoue | 318/571 X |
| 4,402,721 | 9/1983 | Ericson et al. | 364/476 X |

*Primary Examiner*—B. Dobeck

[57] ABSTRACT

An extrusion drive control system for control of extrusion process machinery driven elements. A drive interface unit is adapted for use with any of a variety of drive motors and regulators. The interface unit accepts analog condition information signals from the drive motor and regulator, having any of a plurality of predetermined input characteristics, and provides corresponding digital signals having characteristics that are invariant with respect to the particular input characteristics. The interface unit has a communication channel for receiving digital control signals and for outputting digital signals indicating drive operating conditions. The low power digital circuitry and communications channel are protected from the high voltage and high power connections to the drive and drive regulator.

Extrusion control means comprises the interface unit together with a drive control module, which permits input of control signals including speed set and ratio set, and permits display of at least one of the operating conditions. The drive control module has an internal data bus and a communications channel connected to the data bus and to the interface unit communications channel.

For the control of an extrusion line process, having a plurality of driven elements which have related desired operating speeds, a control system comprises a similar plurality of extrusion control means, all connected to a controller, together with another drive control module for the input of a line speed setting. The controller responds to the input line speed setting and the operating conditions of the driven elements to output appropriate digital control signals to the driven elements to control them to operate at the desired related speeds. The interface unit outputs appropriate analog control signals to the drive units.

5 Claims, 6 Drawing Figures

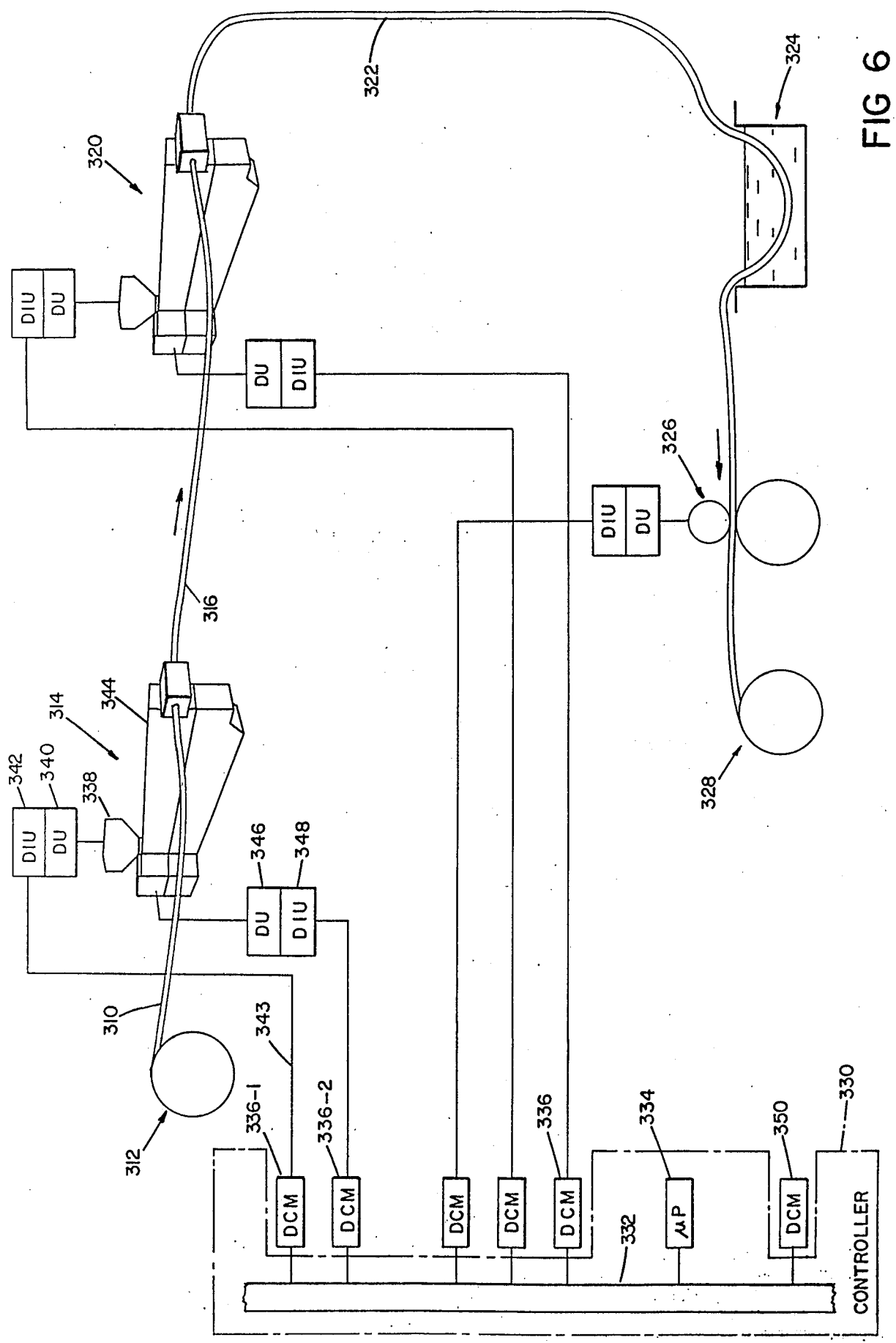

EXTRUSION DRIVE CONTROL SYSTEM

This invention relates to plastics and elastomer extrusion. In particular, it relates to the control, in extrusion equipment, of electric motors which power the drives of the extruder screw, the compactor screw or other drives such as takeups, payoffs and roll stack drives.

Extrusion equipment drives use large electric motors, typically of from 40 to 500 horsepower. Such a motor is typically sold together with a device called a "drive regulator" which contains some electronics, designed to be compatible with the motor, for the control of the motor, in response to start, stop and speed set inputs. In operation of extrusion equipment, in order to control the quality of the extruded product, it is necessary to control the rate of feed of the plastic in the extruder barrel or in the compactor (or the speed of other driven elements of the line) by controlling the drive motor of the extruder screw or the compactor screw (or other driven element) through its regulator. In order to control the drive motor appropriately, it is necessary to know the operating conditions of the drive motor, and to use the information concerning the conditions to determine what changes should be made in the operation of the drive.

Traditionally, such control was done manually. An experienced operator, with knowledge of the operating conditions as shown typically by meters on the machinery, and with his previous experience of the particular system being used, made changes in the operating conditions of the extrusion equipment. Frequently a considerable period of time was required at start-up to place the extrusion equipment in a satisfactory operating mode. During this period of time, the equipment produced extruded product which was generally not usable. As conditions changed, the controls had to be repeatedly reset. During the time required to change the controls, unusable product was often produced. These problems resulted in economic loss.

As a first approach to improving the control of extruder drives, programmable controllers have been introduced. However, these controllers have not been wholly satisfactory, because they are not ready for use as the extrusion process manufacturer receives them. On the contrary, they require considerable individual adaptation both in hardware and software before they can be used.

These problems arise because in practice, the extrusion process manufacturer is generally attempting to retrofit a controller to extrusion equipment, including a drive unit, already in use in his plant. The programmable controller cannot be connected directly to any drive unit, because the programmable controller is a digital device operating with appropriate signals and voltage levels, while the outputs of the drive units are "harsh" signals, of high power and high voltage and subject to wide variability in operation ("spikes") and other forms of electro-magnetic interference, which are incompatible with such operation and which can in fact be injurious to the controller, which must provide high signal integrity.

Further, there is no single standard drive unit (regulator and drive motor) to which the programmable controller is or can be adapted. Rather, there are many different makes, sizes and designs of drive units presently in use by extrusion product manufacturers. Hence, the extruder user who wishes to add a programmable controller to his extruder drive must first design and build special purpose hardware to connect the programmable controller to the regulator and drive motor, to protect the controller and to provide a signal interface. The design of this hardware depends on the particular electrical and design characteristics of the regulator and drive motor.

Next, the programmable controller, as its name suggests, is a device having some data processing capability, which must however be programmed by the user to suit the requirements of the particular drive and drive regulator. This can be a formidable problem for an extrusion process manufacturer, who may have no expertise with programming.

There have also been attempts to control the operation of extrusion drives by computers, but the same problems of special-purpose hardware and necessary programming occur with computers as with programmable controllers.

Problems of a different sort have arisen in connection with complex extrusion manufacture processes. An example of such a process is a wire processing line in which copper wire is paid off, fed through one or more extruders to put a plurality of plastic coatings on the wire, then pulled through a cooling trough or curing tube, and then finally wound on a takeup. It is obviously desirable to have highly accurate coordination among the driven elements. In particular, when starting up, speed is increased step-wise for all the elements, for example in a sequence of ten steps each of a 10% increase in speed, and it is a particular problem to insure that the speeds of the elements remain in correct ratios to one another at all steps of the start-up process. Since it is unlikely that the various drive trains and other mechanical elements are identical throughout their operating ranges, difficulties in maintaining the ratios occur. Furthermore, the volume output of the extruder is not linearly related to screw speed, which means that ratios must be constantly changed as screw speed is increased or decreased. Hitherto, such a start-up process has been controlled by an experienced operator, who must constantly check the conditions of the various drive elements and adjust their ratios accordingly. This process can be time-consuming, and can result in substantial waste of unusuble extruded product. It would therefore be desirable to provide means for line startup that can accomplish this sequence of adjustments in a greatly reduced time.

It is therefore an object of this invention to provide an extrusion drive control system that is readily usable with any of a wide variety of drive units existing in the extrusion process manufacturing field today. It is also an object to provide an extrusion drive control system that does not require either special purpose hardware interface circuitry, or programming effort by the user, but is usable essentially as purchased It is another object to provide a control system that is readily compatible with a host computer, for monitoring or control of the extrusion process line.

It is still another object of the invention to provide an extrusion drive interface unit for use in such a control system that can be employed with either the extruder screw drive, the compactor drive or other downstream drives, without substantial adaptation of the interface unit. Moreover, it is an object to provide a modular control system, permitting a number of such extrusion drive interface units to be connected in modular fashion to an existing controller or to a host computer, with all the advantages of modularity including ease of repair and replacement, standardization of components, and the like.

Another object of the invention is to make possible variable ratio line control of an extrusion system including many driven elements operating as a process line.

It is also an object to increase operating safety, by providing an extrusion drive interface unit that can be physically located with the extrusion drive equipment, while providing simple and low-power connections to more remote equipment such as a controller or computer.

According to a first aspect of the invention, a drive interface unit is provided for use with a drive unit, the drive unit comprising a drive regulator and electric drive motor connected through a drive train to a drive to be controlled. The drive unit provides analog condition information signals indicating a plurality of operating conditions of the drive unit. The operating conditions include drive rpm, armature voltage and armature current. The drive interface unit is adapted to accept analog condition information signals having any of a plurality of predetermined input characteristics and to provaide corresponding digital signals having characteristics that are invariant with respect to the particular input characteristics.

The drive interface unit has analog signal input means for receiving from the drive unit the analog condition information signals; the analog signal input means has selectable means connectable to the drive regulator to receive analog condition information signals having any of a plurality of predetermined input characteristics. The drive interface unit further has analog signal output means for outputting to the drive and drive regulator analog control signals representative of a plurality of drive unit operating commands. The operating commands include on/off commands and speed set commands. The analog signal output means has selectable means connectable to the drive regulator to output analog control signals having any of a plurality of predetermined output characteristics. Further, the drive interface unit has internal data bus means for carrying digital information signals; the digital information signals have characteristics generally substantially different from the predetermined input and output characteristics.

Input signal isolation means is connected between the analog signal input means and the data bus, for providing, for each operating condition, corresponding digital signals in response to input analog condition information signals. The digital signal characteristics are invariant with respect to input of analog condition information signals having any of the plurality of predetermined input characteristics.

Output signal isolation means is connected between the analog signal output means and the data bus, for providing, for each operating command, corresponding analog control signals in response to digital signals. The corresponding analog control signals have a selected one of the predetermined output characteristics.

Command input means is connected to the data bus means for inputting the operating commands. The drive interface unit further has data storing and channeling means connected to the data bus means, having timing means and digital information signal storage. The data storing and channeling means is responsive to the timing means successively to receive from the input signal isolation means digital signals indicating the operating conditions and to store the digital signals in the digital signal storage.

The data storing and channeling means is responsive to input commands to control the analog signal output means to output analog control signals indicating the input operating command.

In a preferred embodiment, the drive interface unit further has communication channel means connected to the data bus means. The communication channel means comprises signal receive means for receiving digital control signals including read and write control signals and signals indicating drive operating commands; the signal receive means comprises the command input means. The communication channel means further comprises signal transmit means for transmitting digital condition information signals. The data storing and channeling means is responsive to reception of a digital read control signal to read digital condition information signals from the digital information signal storage and to control the signal transmit means to transmit the read signals.

The data storing and channeling means is responsive to reception of a digital write control signal together with signals representative of drive operating commands to control the analog signal output means to output analog control signals indicating received drive operating commands.

In another aspect of the invention, extrusion equipment control means is provided, comprising a drive interface unit as described, and a drive control module. The drive control module comprises data bus means, communications channel means connected to the drive interface unit communications channel means and to the drive control module data bus means. The drive control module further has input means connected to its data bus means for inputting drive operating commands, and display means connected to its data bus means, for displaying visual representations of at least one of the drive unit operating conditions.

In a preferred embodiment, the drive control module input means includes means for inputting speed set and ratio set commands.

In yet another aspect of the invention, extrusion line process control means is provided for the variable ratio control of extrusion line process equipment having a plurality of driven elements, the driven elements having related desired operating speeds, and each said driven element having a drive unit including an electric drive motor and regulator therefor and providing analog condition information signals indicating a plurality of operating conditions of the drive unit. The extrusion line process control means comprises a similar plurality of extrusion equipment control means, each as described above, and a further drive control module having means for the input of a line speed set signal. Further the extrusion line process control means has a controller having data processing means and controller data bus means.

Each drive control module data bus means is connected to the controller data bus means for the transfer of digital signals between the drive control modules and the controller data processing means. The controller is responsive to an input line speed set signal and to the digital signals corresponding to operating conditions of the plurality of drive units to output control signals for controlling the plurality of driven units to operate at the related desired operating speeds.

Other objects, features and advantages will appear from the following description of a preferred embodiment of the invention, together with the drawing, in which:

FIG. 6 shows an extrusion process line and line control system according to the invention.

Figure 1:
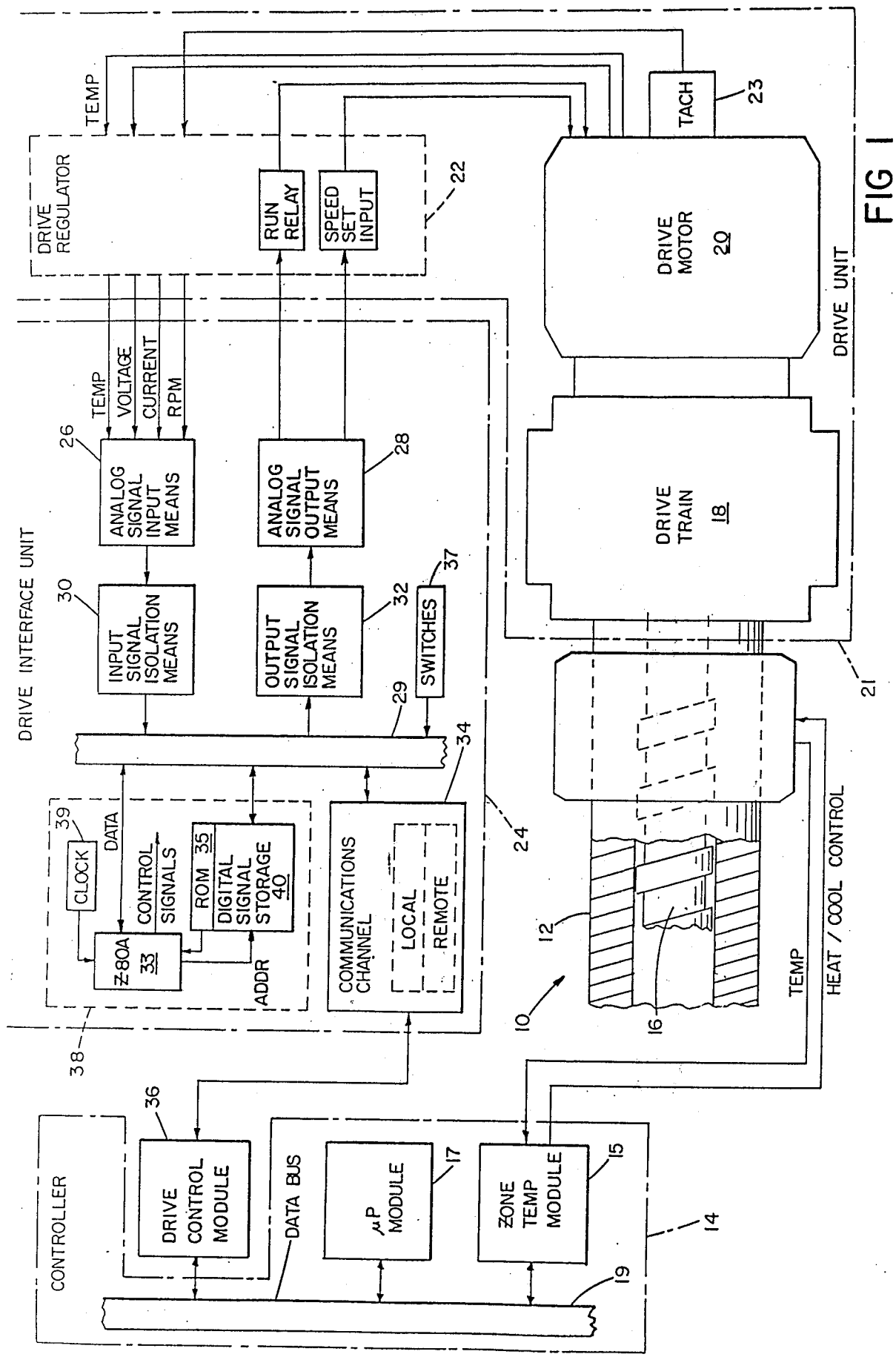
FIG. 1 is simplified block diagram showing of extrusion equipment and an extrusion control system according to the invention, including the drive interface module.

Referring now to the drawing, and in particular to FIG. 1, a section 10 of an extruder is shown in simplified form. The extruder has a barrel 12, provided with temperature sensors, not shown, which provide feedback barrel temperature signals to a controller 14.

Controller 14 provides, for each barrel heating/cooling zone, a zone temperature module 15 which receives the feedback temperature signals. Controller 14 also has a suitable local data processor module 17, which in the embodiment shown is a Z-80 A, but which may be any suitable data processor. Microprocessor module 17 and each zone temperature module 15 are connected to a data bus 19 (backplane) for the transfer of digital data signals among the modules. The microprocessor employs the temperature feedback signals to derive barrel heating and cooling control signals, which are sent from zone temperature module 15 to the extruder to control heating and cooling apparatus, not shown, which controls the input and removal of heat at the barrel zone.

The particular manner of controlling the heating and cooling of the barrel forms no part of the present invention and is not pertinent thereto. A controller of the kind described is shown, for example, in U.S. Pat. No. 4,262,737.

Extruder 10 has a screw 16 which rotates and thereby moves plastic through barrel 12, as controlled by a drive train 18, which may be a gear train or any suitable means. Drive train 18 is powered by an electric drive motor 20, which is typically controlled by element 22, which in the particular embodiment described is a DC static drive regulator. Drive regulator 22, drive motor 20, and drive train 18 comprise a drive unit 21.

Each particular model of drive unit, for which the drive interface unit of the present invention is designed, provides a set of analog condition information signals having characteristics that are predetermined, that is, known for that model. In other words, each model provides a set of signals comprising at least a voltage signal, current signal and RPM signal, but the ranges of the armature current and voltage signals to be input to the drive interface unit differ according to the particular make or size of motor and drive regulator, and may be, for example, in different models 0–180 volts, 0–240 volts, or 0–500 volts, and 0–13 amps to 0–300 amps.

The temperature switch signal is generally a 115 V AC signal. Other 115 V AC signals may be input as desired. The speed of the drive motor may be provided as the output of either an AC or DC tachometer (range 45 or 90 V AC, 50 or 100 V DC) or in certain drive regulators it is provided as the output of a pulse counter or an optical encoder. The particular ranges of the armature current and voltage signals, the voltage of the temperature switch signal, and the nature of the particular drive motor speed signal, together with the voltages of any additional (auxiliary) inputs, are referred to here as the predetermined input characteristics of the set of analog condition information signals.

In the particular embodiment shown in FIG. 1, drive unit 21 provides a set of analog condition information signals indicating a plurality of operating conditions of the controlled drive. In this embodiment, voltage and current signals are taken from tie points on drive regulator 22, but in other cases these signals may be taken directly from the drive motor.

In the particular embodiment described herein, drive speed, which is another operating condition, is a signal from a tachometer 23. However, in some drive units, this feedback is provided by a pulse counter or an optical encoder. The output of a pulse counter or encoder is not strictly analog, but these operating condition signals are considered for present purposes to form part of the set of "analog condition information signals" which may have any of a plurality of input characteristics. In the case of drive speed, the signals have the characteristics of outputs of AC or DC tachometers, or outputs of a pulse counter or encoder. In some types of drive units, the feedback signal representing drive speed (RPM) is derived from the armature voltage rather than an independent feedback signal. In such cases, no connection is made to the RPM terminal board 104 of FIG. 3 (described below).

Another operating condition is the temperature in the motor windings. A temperature switch located in the windings of the motor provides an alarm condition in response to a temperature above a set cut-off level. The state of this signal is either on or off (not alarmed or alarmed), and the signal is in the form, in the present embodiment, of a 115 V AC signal.

Drive regulator 22 controls drive motor 20 by means of a run relay and a speed set, in response to drive operating commands, which may be entered manually directly to the drive regulator, or may be input from some other source, as will be described. Analog control signals, which indicate a plurality of drive unit operating commands including on/off and speed set, are used to control the drive unit.

According to the invention, a drive interface unit or module 24 is provided for connection to the drive unit. Interface unit 24 is adapted to be located physically close to the drive unit, for convenient and safe connection to the drive unit as well as to a controller or host computer, which is typically not located close to the drive unit. It is undesirable to have connections to the high voltage and high current terminals of the drive unit extending any substantial distance over the plant floor. The drive interface unit is adapted to make it possible to keep the hazardous high power and high voltage connections to the drive relatively short, and to provide the necessary long connections to controller or host computer in the form of relatively low power connections.

The drive interface unit 24 has analog signal input means 26, for receiving from the drive unit the analog condition information signals indicating the operating conditions, which include, as described, drive speed, armature voltage and armature current, as well as the output of the temperature switch. The analog signal input means has selectable means (not shown in FIG. 1 but shown in FIG. 3), connectable to drive unit 21 to receive the analog condition information signals. The selectable means will accept analog condition information signals having any of a plurality of predetermined input characteristics. This will be further described in what follows.

Drive interface unit 24 further has analog signal output means 28 for outputting to drive unit 21 analog control signals indicating the on/off command (to the run relay) and the speed set command (to the speed set input). Other control signals could be similarly output.

Drive interface unit 24 further has an internal 16-bit parallel digital data bus 29, for carrying digital information signals among the various elements of unit 24. The digital information signals have generally substantially different characteristics from the input analog signals and output analog signals, being typically 5 volts instead up to 500 volts. An exception to this is the input of drive RPM from an encoder, which is itself a 5 volt signal. It will be appreciated that the 5 V data bus cannot be safely exposed to the relatively high power analog condition information signals from drive unit 21.

In the particular embodiment described, the 16 bit data bus is regarded as divided into a data signal portion and a functional signal portion. The bits of the functional signal portion are decoded in the circuitry by conventional decoders, not shown, to derive control signals. This has been indicated in the drawing by separate lines labeled "control", in order to show the function of these signals. However, they are in this embodiment carried on the data bus. Appropriate control signals for the operation of the circuitry could be provided in many other ways, as will be well understood by those skilled in the art.

Drive interface unit 24 has input signal isolation means 30 connected between analog signal input means 26 and data bus 29. Input signal isolation means 30 provides, for each operating condition, corresponding digital signals in response to input analog condition information signals. The digital signal characteristics (voltage level) are invariant with respect to input of analog condition information signals having any of the described plurality of predetermined input characteristics. That is, no matter which of the possible models of drive regulator is connected to the analog signal input means, the digital signals within drive interface unit 24 remain 5 volt signals. At the same time, the internal data bus 29 and other internal digital circuitry are protected from the effects of the relatively high power analog condition signals from drive unit 21.

Further, drive interface unit 24 has output signal isolation means 32 connected between analog signal output means 28 and data bus 29. Output signal isolation means 32 provides, for each drive operating command, corresponding analog control signals in response to digital signals. The drive unit is connected to the analog signal output means 28 appropriately to receive output analog control signals having a selected one of the described plurality of predetermined output characteristics. At the same time, the internal data bus 29 and other 5 V internal circuitry are protected from the effects of the relatively high power analog output signals.

Drive interface unit 24 also has communications channel means 34 connected to data bus 29. The communications channel means includes signal transmit and receive means, not separately indicated in FIG. 1 but shown in FIG. 2. The signal receive means permits drive operating commands to be input to drive interface unit 24, as will be described. Drive operating commands could also be input directly to unit 24 through suitable manual controls.

Drive interface unit 24 further has data storing and channeling means 38, which in the particular embodiment described herein comprises a Z-80 A microprocessor 33 with clock 39 and necessary memory, including ROM 35 and digital signal storage 40. The data storage and channeling means 38 is connected to the data bus 29.

Drive interface unit further has switches 37, whose inputs are connected to data bus 29, for the input of selection signals indicating the particular drive unit to be connected to drive interface unit 24. In response to these switch settings, appropriate programming in ROM 35 is accessed for processing of the received condition information.

The data storing and channeling means 38, in response to timing signals from clock 39 and as controlled in detail by its own programming stored in the ROM 35, successively receives from input signal isolation means 30 digital signals indicating the operating conditions of the drive and drive regulator, and stores the digital signals in digital signal storage 40. The manner of programming a suitable microprocessor to perform this operation is well known in the art and forms no part of the present invention.

Communications channel means 34 in the particular embodiment described includes both local and remote communications means. The local means is connectable to a modular drive control unit 36, to be described in more detail in what follows. Briefly, unit 36 provides means to input start, stop, ratio and speed set commands, and provides a display.

Drive interface unit 24 is connectable to a particular extruder system controller 14 through drive control module 36 and the local portion of communication channel 34. Drive interface unit 24 may be connected to a host computer directly through the remote portion of communications channel 34. Alternatively, unit 24 may be connected to a second controller (not shown) through the remote portion of communications channel 34 and a drive control module 36, to permit operation of the drive unit from more than one location.

Under the control of either the host computer or, in the particular embodiment, system controller 14, digital control signals are sent to communications channel 34 of drive interface unit 24. Such digital control signals include read and write control signals, and signals indicating drive operating commands, such as start, stop, and speed set.

The data storing and channeling means 38 responds to a digital read control signal received at communications channel 34, whether from a host computer or from controller 14, to read stored digital condition information signals from storage 40. Data storing and channeling means 38 controls communications channel 34 to transmit such signals to drive control unit 36. Data storing and channeling means 38 is responsive to a digital write control signal received at 34, together with signals indicating drive operating commands, to control analog signal output means 28 to output to drive regulator 22 analog control signals indicating the received drive operating commands.

Figure 2:
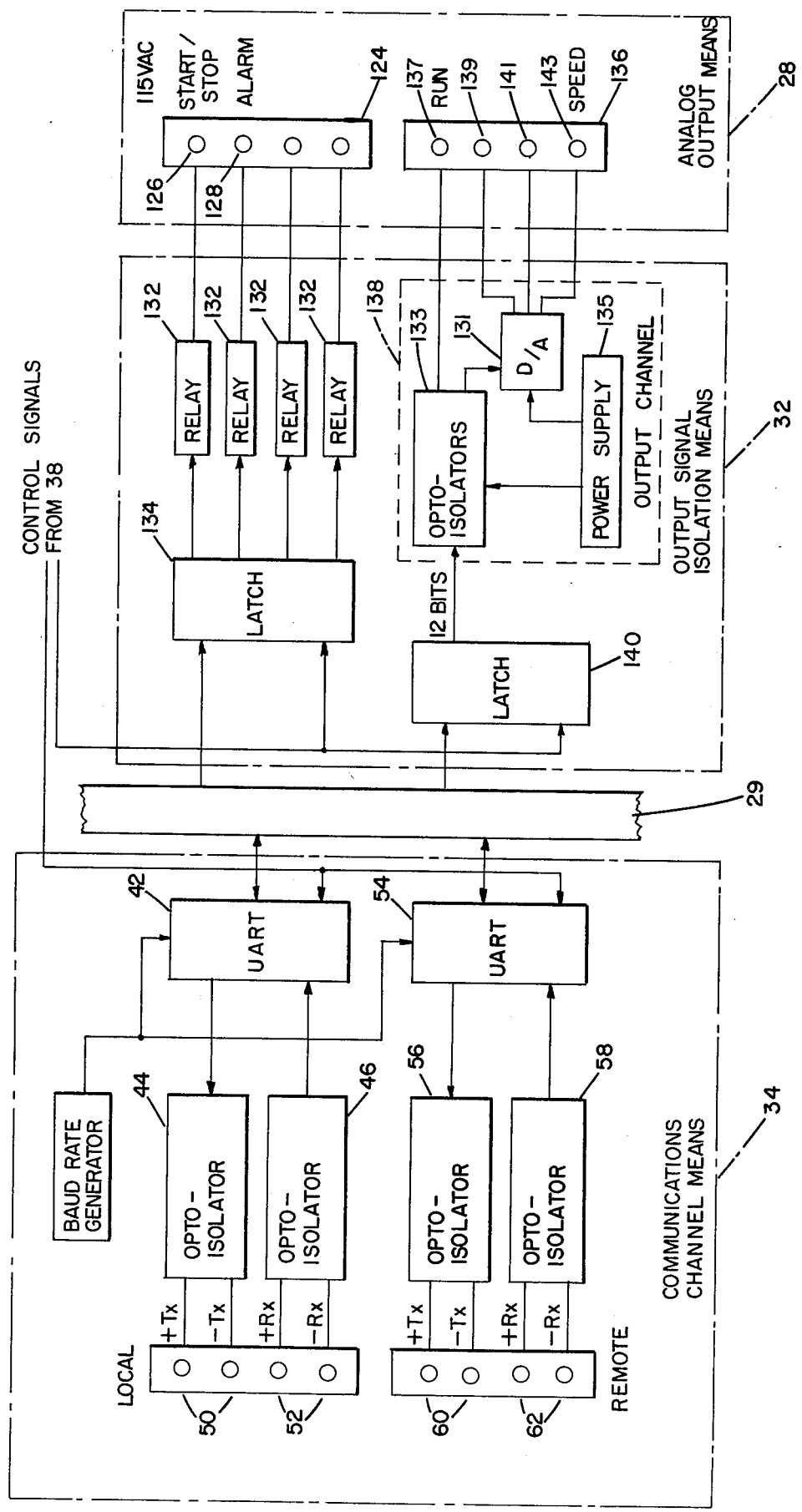
FIG. 2 shows portions of the drive interface module in greater detail.

Referring now to FIG. 2, communications channel means 34 comprises a standard UART (universal asynchronous receiver/transmitter) 42 connected to data bus 29. Two opto isolators 44 and 46 are connected to UART 42, providing respectively transmit lines and receive lines, connected to local transmit means 50 and receive means 52. Data storage and channeling means 38 responds to reception of a digital read control signal from drive control unit 36 by receive means 52 to read previously stored digital condition information signals from the digital information signal storage 40 and to control the signal transmit means 50 to transmit the signals to drive control unit 36.

Communications channel 34 also provides a second UART 54, similarly connected through two opto isolators 56 and 58 to remote transmit means 60 and receive means 62. This remote channel is available for connection to a host computer, if desired, or to a second operator control station.

Figure 3:
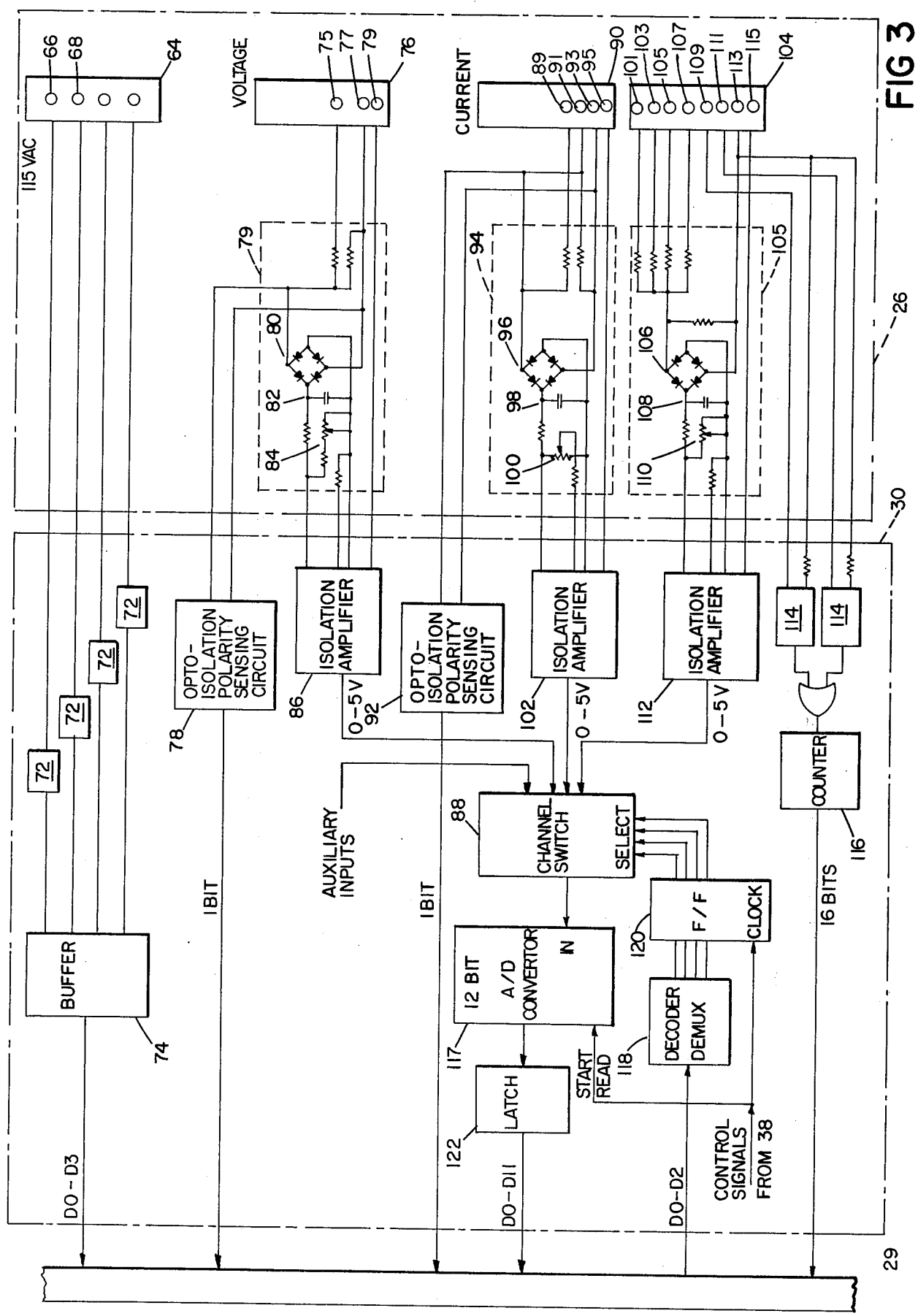
FIG. 3 shows other portions of the drive interface module in greater detail.

Referring now to FIG. 3, input signal isolation means 30 and analog signal input means 26 are shown in more detail.

Analog signal input means 26 provides terminal boards 64, 76, 90, and 104, with another auxiliary terminal board, not shown.

First, 115 V AC terminal board 64 has a terminal 66 for the input of the temperature switch signal from drive unit 21 (specifically from drive motor 23, in the present embodiment), and a terminal 68 for the input of a signal from an emergency stop circuit having buttons located physically near the drive motor or the extruder. The remaining two terminals of board 64 are spares. These terminals sense on-off conditions, and can be used in various ways as desired. For example, these terminals may be used for the input of signals such as tension or position mode selection, or jog mode selection. One of these terminals may be used for manual input of local/remote communications channel selection. This signal selects control by either local or remote input to communications channel 34. The input line from each terminal of board 64 passes to an opto isolator 72. The 5 volt signals from the opto isolators 72 are all input to buffer 74. These signals need not be digitized, since the opto isolator responds to an on/off condition of the input signal. The outputs of buffer 74 are connected to data bus 29, for input of the digital signals D0-D3.

Next, armature voltage terminal board 76 of analog signal input means 26 has three terminals 75, 77 and 79 for the input of armature voltages. An opto-isolated polarity sensing circuit 78 senses the polarity of the input signal, and is connected to data bus 29 for the input of a single digital signal representing the polarity. Circuitry 78, with circuitry 92 (described below) makes possible the use of the drive interface unit with regenerative drives. The analog voltage signal is also input from terminal board 76 to circuitry 79 including a bridge rectifier 80 and filter 82, and a variable resistor 84. Terminal board 76 together with circuitry 79 comprises selectable means connectable to a drive unit to receive analog armature voltage signals having one of a plurality of predetermined voltage ranges.

The output of circuit 79 is input to isolation amplifier 86, whose 0–5 V output is an input to channel switch (analog multiplexer) 88.

Next, armature current terminal board 90 of analog signal input means 26 provides four terminals (shield, common, 100 millivolt shunt, 50 millivolt shunt) 89, 91, 93, 95 for the input of armature currents in the ranges 0-10, 0-500 amps. An opto-isolated polarity sensing circuit 92 senses the polarity of the input signal (for use with regenerative drives), and is connected to data bus 29 for the input of a single digital signal representing the polarity. The analog current signal is also input from terminal board 90 to circuitry 94 including a bridge rectifier 96 and filter 98, and a variable resistor 100. Terminal board 90 together with circuitry 94 comprises selectable means connectable to a drive unit to receive analog armature current signals having any of a plurality of predetermined voltage (representative of current) ranges.

The output of circuit 94 is input to isolation amplifier 102, whose 0–5 V output (a function of the armature current) is an input to channel switch (analog multiplexer) 88.

Analog signal input means 26 further provides a drive RPM input terminal board 104, having eight terminals (101, 103, 105, 107, 109, 111, 113, 115) for the input of signals indicating drive RPM. Such input signal may be, in certain drive regulator models, a DC signal (either 100 VDC or 50 VDC) (per 1000 RPM) which is input at terminals 101 or 103, or it may be, in other drive regulator models, an AC signal (either 90 or 45 VAC) (per 100 RPM) which is input at terminals 105 or 107. In still other models the RPM signal may be provided by the 115 VAC output of a rotor pulser, which must be input to terminal 109, or by the 5 VDC output of an encoder, which must be input to terminal 111. As has been noted, for purposes of the description of the invention, these signals are considered to form part of the set of analog condition information signals even though they are not, in fact, analog. (Terminals 113 and 115 are common and shield.)

The analog RPM signal input from terminal board 104 is input to circuitry 105 including a bridge rectifier 106 and filter 108, and a variable resistor 110. Terminal board 104 together with circuitry 105 comprises selectable means connectable to a drive regulator to receive drive RPM signals having any of a plurality of predetermined characteristics (DC or AC, voltage and current ranges, pulser or encoder).

The output of circuitry 105 is input to isolation amplifier 112, whose 0–5 V output (a function of the tachometer input) is an input to channel switch (analog multiplexer) 88.

When the drive motor RPM signal is input from either a rotorpulser or an encoder, the input signal is input through one of optocouplers 114 to counter 116. Counter 116 has a 16-bit output, which is connected to data bus 29.

The output of channel switch 88 is input to a 12-bit analog to digital convertor 117. Three coded digital signals from data storing and channeling means 38 are decoded at decoder/demultiplexer 118, to provide output signals which are input to flip flop 120. These coded digital signals may be any suitable combination of signals. The manner of choosing coded digital signals to control a quadruple flip flop is well known in the art and will not be described here. The outputs of flip flop 120 control channel switch 88. The digital signals from convertor 117 are output, through latch 122, to data bus 29.

The auxiliary analog signal input means terminal board, not shown in the drawing, is substantially similar to terminal boards 76 or 90, and may be used for the input of such condition information as gauge, position or tension trim, for example in sheeting processes. The signals are conditioned and isolated and input to channel switch 88 substantially as has been described in connection with the signals input at 76 and 90.

Referring now again to FIG. 2, analog signal output means 28 provides terminal boards 124 and 136. First, 115 V AC terminal board 124 has terminals 126 and 128 for the output of start/stop and alarm signals respectively. Two other terminals on board 124 are spare. These terminals may be used for other logic functions, such as the selection of remote control in situations where two controllers are connected to the drive interface module and it is desired to give priority to commands from one of them. Each terminal of board 124 is connected through a relay 132 to the outputs of latch 134. Latch 134 receives four digital signals from data bus 29. The start/stop signal is output in response to a start/stop command; a stop signal is output in response to an emergency stop, as has been described. An alarm analog output is output in response to the temperature switch input to terminal board 64 of analog signal input means 26 (FIG. 3), among other alarm conditions.

Analog signal output means 28 also provides an output speed set terminal board 136, having terminals 137 (for "run" output), and terminals 139, 141, and 143 for the output of analog speed set signals having any of a plurality of predetermined output characteristics. An output channel 138 includes a set of opto isolators 133 and a digital to analog convertor 131, both powered by an independent power supply 135. The opto isolators 133 receive a 12-bit parallel digital signal from latch 140, which is connected to data bus 29. The "run" output is connected directly to terminal 137; the speed set outputs are connected through D/A converter to the remaining terminals. The drive unit is connected to the terminal which provides an output signal of appropriate output characteristics.

Figure 4:
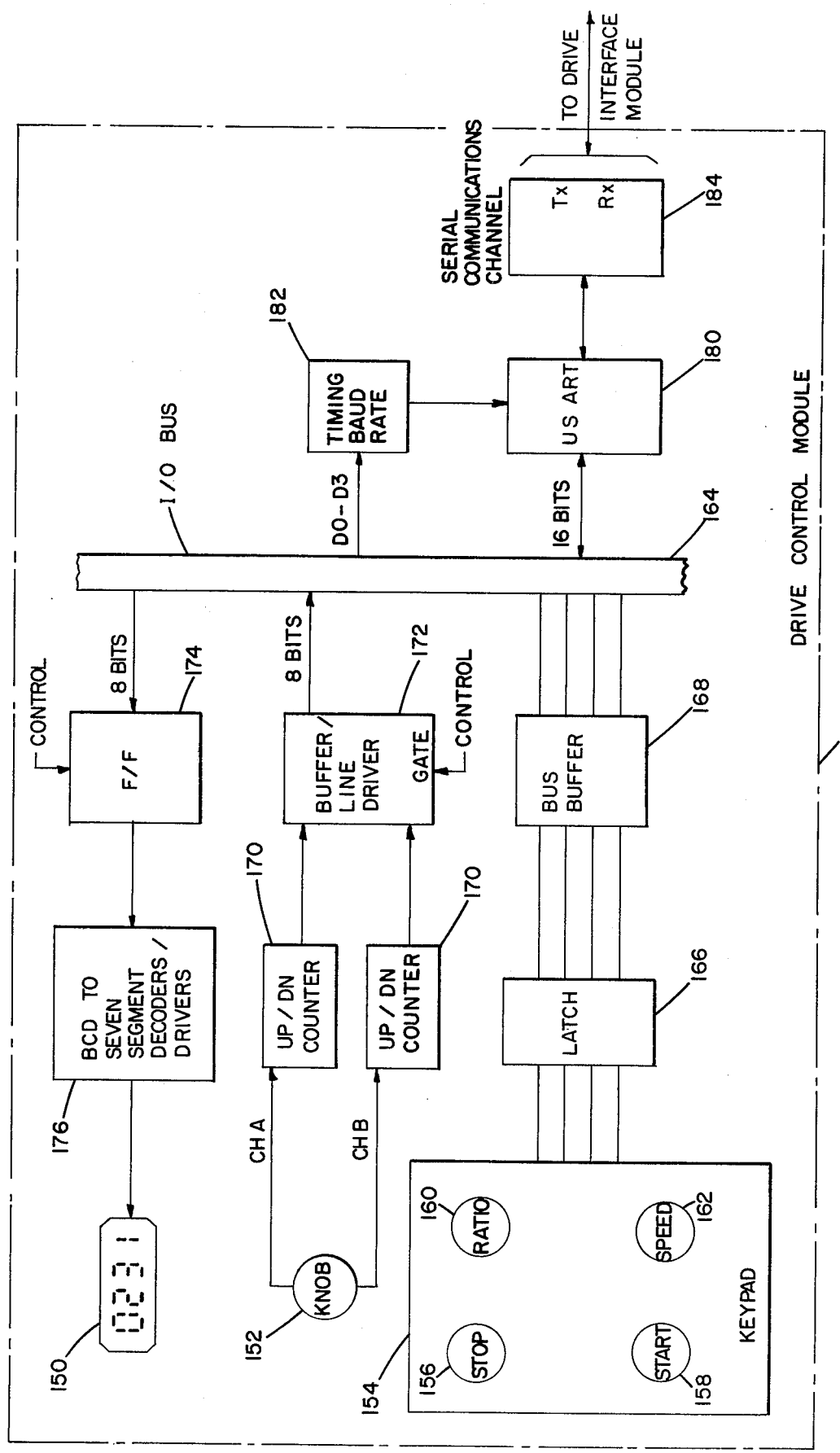
FIG. 4 shows the drive control module in greater detail.

Referring now to FIG. 4, drive control module 36 provides externally a four digit numerical display 150, a speed/ratio input means (knob) 152, and a keypad 154 having four keys. Input means 152 and keypad 154 are operator controls. The operator can input a Stop command through key 156, or a Start command through key 158. Keys 160 (ratio) and 162 (speed) determine whether the setting of knob 152 is interpreted as a speed set or a ratio set. Means 152 and key 160 together comprise ratio input means.

Internally, drive control module 36 provides a data bus 164, which is connectable to the data bus 19 of controller 14. The four inputs from keypad 154 pass through a latch 166 and bus buffer 168 to data bus 164. The input from means 152 is numerical, representing a change of setting of the knob, and is used to update two up/down counters 170, whose outputs are connected to a buffer/line driver 172. The outputs of line driver 172 are connected to data bus 164. Data signals from data bus 164 are output through flipflops 174 to a set 176 of BCD-to-seven-segment decoders/drivers, appropriate to control the display 150.

Drive control module 36 further provides a USART (universal synchronous/asynchronous receiver/transmitter) 180, controlled by a timing circuit 182, to provide serial data for transmission at communications channel 184, or to receive serial data from channel 184. Channel 184 is connectable to the local communications channel of drive interface module 24.

In a preferred embodiment, controller 14 is constructed modularly to receive a variable number of drive control modules 36, which are physically plugged into the backplane (I/O bus) 19 of controller 14, thereby connecting the data bus 164 to the controller bus 19. Each drive unit to be controlled is provided with a drive interface unit or module 24, of construction as has been described, located physically at the drive unit. A simple 4-wire 20 milliamp communication link connects drive control module 36 to its respective drive interface unit 24.

In operation, a start command is input at drive control module 36 through key 158 of keypad 154. Depression of this key generates digital signals indicating a write control signal and the drive unit operating command "start". These signals are input to the data bus 164, and are transmitted by serial communications channel 184 over the 4-wire communication link to drive interface unit 24.

The digital signals are received by drive interface unit 24 signal receive means 52. The data storing and channeling means 38 is responsive to reception of the write control signal to control the analog signal output means 28 to output an analog control signal for "start". This signal is output to close the run relay of drive regulator 22, which connects the armature of the drive motor to the controller.

The operator then inputs a speed setting through means 152. The digital signals generated by this action represent a write control signal and the drive unit operating command "set speed" to a particular value, expressed as an RPM setting or as a percentage of full range. The speed setting may be displayed at display 150 or if desired on controller 14. These signals are similarly transmitted to the drive interface unit, which in turn outputs analog control signals to the drive unit speed set input, which by controlling the voltage at the armature causes the motor to operate at the set speed.

The actual speed of the motor is received by drive interface unit 24 as a feedback signal from tachometer 23. This and the other drive operating conditions, as has been described, are continually monitored by the drive interface unit, and data storing and channeling means 38, responsive to clock 39, successively receives and stores digital signals indicating the operating conditions in storage 40.

At appropriate times, as controlled by read commands from microprocessor module 17, digital condition information signals indicating the actual speed of the motor are transmitted by transmit means 50 over the 4-wire communications link to drive control module 36, where they are received by channel 184 and placed on bus 164. These signals set flip flops 174 whose outputs are connected to decoders/driver 176, and appear as the numbers of a four-digit display at 150, or if desired, on a display on controller 14. At the same time, these signals are available on backplane I/O bus 19 and are input to microprocessor module 17 for use in control computations there. Similarly, as controlled by read commands from microprocessor module 17, digital condition information signals indicating armature voltage and current, alarm signals, or emergency stop signals are transmitted by drive interface unit 24 to drive control module 36, where the signals are placed on bus 164 and thereby on bus 19 of controller 14.

The drive interface unit of the invention may also be employed with an AC drive motor and AC static inverter or variable frequency inverter drive. In such case, the operating conditions of interest are RPM and motor current. Analog signals indicating these operating conditions can be input to the drive interface unit.

Figure 5:
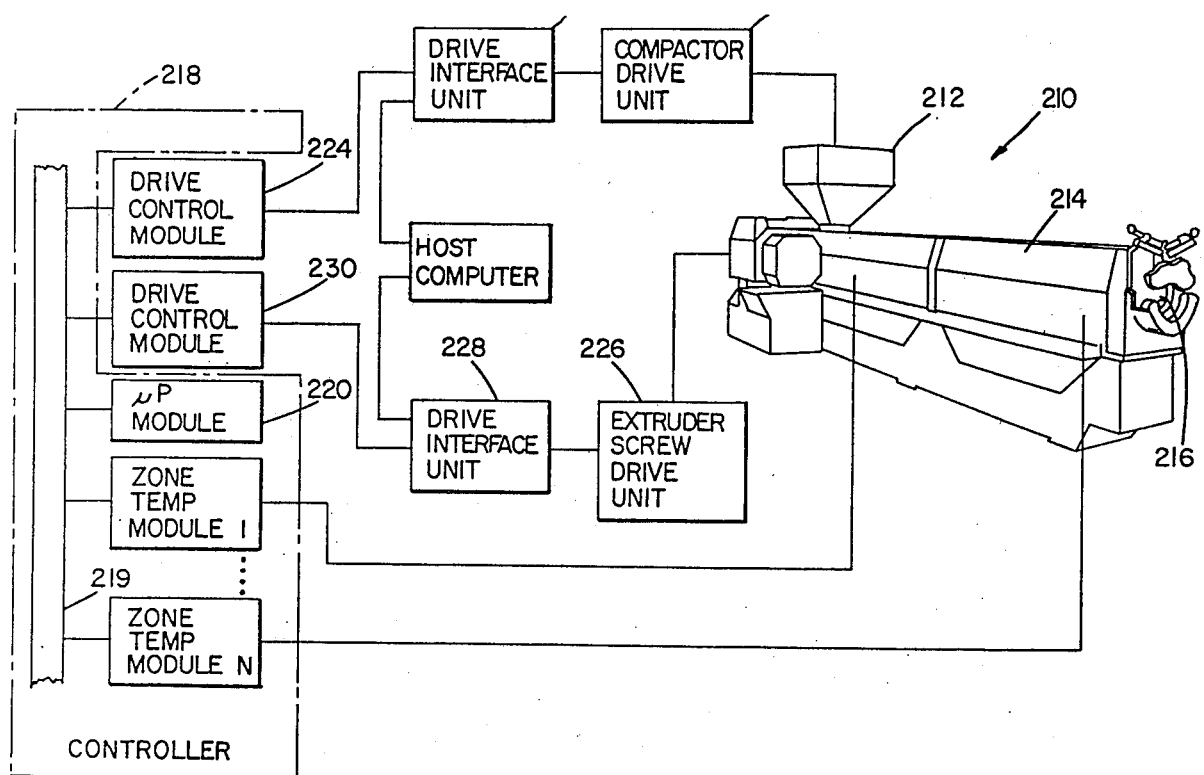
FIG. 5 shows extrusion equipment and an extrusion control system according to the invention, including control of the compactor screw.

Referring now to FIG. 5, an extrusion apparatus 210 is seen which has a compactor indicated generally at 212, and an extrusion barrel 214. Extruded product is output at die 216. A controller 218, of the type previously described, provides zone temperature modules 1 . . . N for the control of N barrel temperature zones. Controller 218 further provides a microprocessor module 220, of the kind previously described. Two drive control modules of the kind shown in FIG. 4 are connected into controller 218. The compactor screw (not shown) is powered by a compactor drive unit 221, which is connected to a drive interface unit 222, of the kind shown in FIGS. 1-3. Drive interface unit 222 is connected to drive control module 224. The extruder screw (not shown) is powered by a drive unit 226, which is connected to a drive interface unit 228, of the kind shown in FIGS. 1-3. Drive interface unit 228 is connected to drive control module 230. Both drive control modules 224 and 230 have their respective data buses 164 connected to controller data bus 219. The control system comprising controller 218, the two drive control modules 224 and 230, and the two drive interface units 222 and 228, permits the microprocessor module 220, as controlled by appropriate programming, to receive information on the operating conditions of both the compactor drive and the extruder screw drive, and to use such information to control operation of the extrusion system.

Referring now to FIG. 6, an extrusion line process system is seen in which a metal wire 310 is paid off a reel 312 to a first extruder 314. A first coating of plastic is placed on wire 310 in extruder 314. Coated wire 316 is then conveyed to a second extruder 320, where a second coating is placed on the wire. The product 322 of extruder 320 is then drawn through a cooling bath in trough 324, and is conveyed by driven reel 326 to a takeup 328. It will be appreciated that it is important that the drives of extruder 314 (both compactor and extruder screw), extruder 320 (compactor and extruder screw), and driven reel 326 be accurately controlled so as to cooperate in moving the workpiece through the process in a manner to achieve a uniform and usable product. In particular, in the start-up phase, when the various drives are moved successively from stopped condition to a first speed setting (for example, 10% of full range) and then to increased speeds, it is essential that all drives maintain appropriate speed ratios. Because of the nature of machinery, and the nonlinear relationship of volume output to screw speed, these ratios will vary at different operating speeds.

A controller 330 is provided, having a data bus (backplane) 332 and a microprocessor unit 334, of the kind previously described. For each driven element in the line, a drive control module 336 is provided and is connected to bus 322. For extruder 314, compactor 338 is connected to a drive unit 340, which is connected to a drive interface unit 342 of the kind shown in FIGS. 1-3. Drive interface unit 342 is connected by a 4-wire current loop 343, as previously described, to the respective drive control module 336-1. The extruder screw in barrel 344 is similarly controlled by a drive unit 346, provided with a drive interface unit 348, which is connected to a drive control module 336-2. Similarly, each driven element of the line is connected through a drive interface unit to a drive control module 336 connected to controller 330.

Each drive control module provides ratio input means, as described in connection with FIG. 5, permitting a ratio value to be input to the driven element. As the line is brought to full operating status, these ratio settings are easily varied. The actual operating speed of each driven element may be displayed at the respective drive control module, all of which are physically located together at controller 330; alternatively, the actual speeds may be displayed on controller 330. The operating conditions of the driven elements are available to microprocessor module 334 for computational and control purposes. A further drive control module 350, not connected to any single drive, is used to input a line speed set or master reference value to controller 330. This line speed set is employed by controller 330, together with the operating conditions of the various drives, to derive appropriate speed set commands for output to all the driven elements, and to permit controlled variable ratio operation of the extrusion system.

What is claimed is:

1. For use with a drive unit including an electric drive motor and regulator therefor and providing analog condition information signals indicating a plurality of operating conditions of the drive unit, said operating conditions including drive rpm, armature voltage and armature current, a drive interface unit adapted to accept said analog condition information signals having any of a plurality of said of predetermined input characteristics and to provide corresponding digital signals having characteristics invariant with respect to the particular said input characteristics, said drive interface unit having analog signal input means for receiving from said drive unit a set of said analog condition information signals, said analog signal input means having selectable means connectable to said drive unit to receive said set of analog condition information signals having any of a plurality of predetermined input characteristics, analog signal output means for outputting to said drive unit analog control signals representative of a plurality of drive operating commands, said operating commands including on/off commands and speed set commands, said analog signal output means having selectable means connectable to said drive unit to output said analog control signals having any of a plurality of predetermined output characteristics, internal data bus means for carrying digital information signals, said digital information signals having characteristics generally substantially different from said predetermined input and output characteristics, input signal isolation means connected between said analog signal input means and said data bus, for providing, for each said operating condition, corresponding said digital signals in response to input said analog condition information signals, said digital signal characteristics being invariant with respect to input of said set of analog condition information signals having any of said plurality of predetermined input characteristics, output signal isolation means connected between said analog signal output means and said data bus means, for providing, for each said drive operating command, corresponding said analog control signals in response to said digital signals, said analog control signals having a selected one of said predetermined output characteristics, and command input means connected to said data bus means for inputting drive operating commands, data storing and channeling means connected to said data bus means and having timing means and digital information signal storage, said data storing and channeling means being responsive to said timing means successively to receive from said input signal isolation means said digital signals indicating said drive operating conditions and to store said digital signals in said digital signal storage, said data storing and channeling means being responsive to said input commands to control said analog signal output means to output said analog control signals indicating said input command.

2. The drive interface unit of claim 1, further having communication channel means connected to said data bus means and including signal receive means for receiving digital control signals including read and write control signals and signals indicating drive unit operating commands, said signal receive means comprising said command input means, and signal transmit means for transmitting digital condition information signals, said data storing and channeling means being responsive to reception of a said digital read control signal to read digital condition information signals from said digital information signal storage and to control said signal transmit means to transmit said read signals, said data storing and channeling means being responsive to reception of a said digital write control signal together with said signals indicating drive operating commands to control said analog signal output means to output analog control signals indicating received said drive operating commands.

3. Extrusion equipment control means comprising
a drive interface unit as claimed in claim 2, and
a drive control module comprising
data bus means communications channel means connected to said drive interface unit communications channel means and to said drive control module data bus means, input means connected to said data bus means for inputting drive operating commands, display means connected to said data bus means, for displaying visual representations of at least one said drive unit operating condition.

4. Extrusion equipment control means as claimed in claim 3, wherein said drive control module input means includes means for inputting speed set and ratio set commands.

5. For the variable ratio control of extrusion line process equipment having a plurality of driven elements, said driven elements having related desired operating speeds, each said driven element having a drive unit including an electric drive motor and regulator therefor and providing analog condition information signals indicating a plurality of operating conditions of the drive unit, extrusion line process control means comprising a similar plurality of extrusion equipment control means each as claimed in claim 4, a further drive control module having means for the input of a line speed set signal, and a controller having data processing means and controller data bus means, each said drive control module data bus means being connected to said controller data bus means for the transfer of said digital signals between said drive control modules and said controller data processing means, said controller being responsive to an input said line speed set signal and said digital signals corresponding to operating conditions of said plurality of drive units to output control signals for controlling said plurality of driven units to operate at said related desired operating speeds.

* * * * *